United States Patent
Carlson et al.

(10) Patent No.: US 11,738,493 B2
(45) Date of Patent: Aug. 29, 2023

(54) METHOD OF MANUFACTURING AN ASSEMBLY FIXTURE AND A COMPOSITE PRODUCT

(71) Applicant: Textron Innovations Inc., Fort Worth, TX (US)

(72) Inventors: David G. Carlson, North Richland Hills, TX (US); Douglas K. Wolfe, Denton, TX (US); James A. Cordell, Azle, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 106 days.

(21) Appl. No.: 17/242,014

(22) Filed: Apr. 27, 2021

(65) Prior Publication Data

US 2021/0308926 A1 Oct. 7, 2021

Related U.S. Application Data

(62) Division of application No. 16/814,622, filed on Mar. 10, 2020, now Pat. No. 11,077,596, which is a
(Continued)

(51) Int. Cl.
*B23P 19/10* (2006.01)
*B32B 27/02* (2006.01)
(Continued)

(52) U.S. Cl.
CPC .............. *B29C 48/05* (2019.02); *B25B 11/02* (2013.01); *B29C 33/3842* (2013.01);
(Continued)

(58) Field of Classification Search
CPC ...... B23P 19/10; B23P 2700/01; B25B 11/02; B29C 33/3842; B29C 64/118;
(Continued)

(56) References Cited

U.S. PATENT DOCUMENTS 5,817,269 A 10/1998 Younie et al.
6,905,115 B2 6/2005 Kato
(Continued)

FOREIGN PATENT DOCUMENTS

CN 101794332 A * 8/2010
WO 2004096512 A2 11/2004
(Continued)

OTHER PUBLICATIONS

Translation of CN 101794332 A (published on Aug. 4, 2010).*
(Continued)

*Primary Examiner* — Leo B Tentoni
(74) *Attorney, Agent, or Firm* — Akona IP

(57) ABSTRACT

In one embodiment, a method includes fastening a plurality of components of a composite structure in an assembly fixture, wherein the assembly fixture comprises a plurality of strands of a fiber-reinforced thermoplastic material, wherein the fiber-reinforced thermoplastic material comprises a thermoplastic embedded with a plurality of reinforcement fibers, wherein the plurality of reinforcement fibers is aligned within each strand of the plurality of strands, and wherein the assembly fixture further comprises an anisotropic thermal expansion property based on an orientation of the plurality of reinforcement fibers within the assembly fixture; and heating the assembly fixture in an autoclave to bond the plurality of components of the composite structure.

20 Claims, 7 Drawing Sheets

Related U.S. Application Data division of application No. 15/710,797, filed on Sep. 20, 2017, now Pat. No. 10,654,208.

(51) Int. Cl.

| | | |
|---|---|---|
| *B33Y 10/00* | (2015.01) | |
| *B29C 48/05* | (2019.01) | |
| *B29C 63/00* | (2006.01) | |
| *B64C 11/16* | (2006.01) | |
| *B64C 3/00* | (2006.01) | |
| *B29C 70/52* | (2006.01) | |
| *B29C 64/118* | (2017.01) | |
| *B29C 33/38* | (2006.01) | |
| *B64F 5/10* | (2017.01) | |
| *B29C 65/78* | (2006.01) | |
| *B29C 65/00* | (2006.01) | |
| *B25B 11/02* | (2006.01) | |
| *B29C 70/54* | (2006.01) | |
| *B29K 105/10* | (2006.01) | |
| *B29K 105/14* | (2006.01) | |
| *B29L 31/00* | (2006.01) | |
| *B29L 31/08* | (2006.01) | |
| *B29L 31/30* | (2006.01) | |

(52) U.S. Cl.
CPC ........ *B29C 63/0069* (2013.01); *B29C 64/118* (2017.08); *B29C 65/78* (2013.01); *B29C 65/7802* (2013.01); *B29C 66/721* (2013.01); *B29C 66/7311* (2013.01); *B29C 66/73111* (2013.01); *B29C 66/73112* (2013.01); *B29C 70/52* (2013.01); *B29C 70/541* (2013.01); *B29C 70/543* (2013.01); *B32B 27/02* (2013.01); *B64C 3/00* (2013.01); *B64C 11/16* (2013.01); *B64F 5/10* (2017.01); *B23P 2700/01* (2013.01); *B29K 2105/106* (2013.01); *B29K 2105/14* (2013.01); *B29K 2995/0044* (2013.01); *B29L 2031/08* (2013.01); *B29L 2031/082* (2013.01); *B29L 2031/3076* (2013.01); *B29L 2031/3079* (2013.01); *B29L 2031/3082* (2013.01); *B29L 2031/3085* (2013.01); *B29L 2031/3088* (2013.01); *B29L 2031/757* (2013.01); *B32B 2262/0215* (2013.01)

(58) Field of Classification Search
CPC .............. B29C 65/7802; B29C 66/721; B29C 66/73112; B29C 70/541; B29C 70/543; B29K 2995/0044; B29L 2031/08; B29L 2031/082; B29L 2031/3076; B29L 2031/3079; B29L 2031/2082; B29L 2031/3085; B29L 2031/3088; B32B 27/02; B32B 2262/0215; B33Y 10/00; B64F 5/10
USPC ........ 264/108, 219, 257, 258, 308; 156/242; 29/464, 559, 889.6, 889.71
See application file for complete search history.

(56) References Cited

U.S. PATENT DOCUMENTS

| | | |
|---|---|---|
| 2002/0078545 A1 | 6/2002 | Munk et al. |
| 2005/0247851 A1 | 11/2005 | Kessler et al. |
| 2009/0001630 A1 | 1/2009 | Astwood et al. |
| 2011/0143140 A1* | 6/2011 | Pham .................. B29C 70/543 156/60 |
| 2016/0303808 A1 | 10/2016 | Humfeld et al. |
| 2016/0311176 A1* | 10/2016 | Thompson ............ B29C 70/342 |
| 2017/0015061 A1 | 1/2017 | Lewicki et al. |
| 2017/0057164 A1 | 3/2017 | Hemphill et al. |
| 2017/0173868 A1* | 6/2017 | Mark .................... B29C 64/118 |
| 2018/0150993 A1 | 5/2018 | Newell et al. |
| 2019/0032491 A1 | 1/2019 | Nissen et al. |
| 2020/0346382 A1 | 11/2020 | Carlson et al. |

FOREIGN PATENT DOCUMENTS

| | | |
|---|---|---|
| WO | 2004096512 A3 | 6/2005 |
| WO | 2014058561 A1 | 4/2014 |
| WO | 2017077508 A1 | 5/2017 |

OTHER PUBLICATIONS

EPO Examination Report issued in EP Application Serial No. 17201978.8 dated Jun. 22, 2018, 7 pages.
EPO Search Report issued in EP Application Serial No. 17201978.8 dated May 28, 2018, 4 pages.
USPTO Non-Final Office Action for U.S. Appl. No. 15/710,797 dated Jul. 17, 2019.
USPTO Non-Final Office Action for U.S. Appl. No. 15/710,797 dated Oct. 11, 2019.
USPTO Non-Final Office Action issued in U.S. Appl. No. 16/814,622 dated Mar. 16, 2021.

* cited by examiner

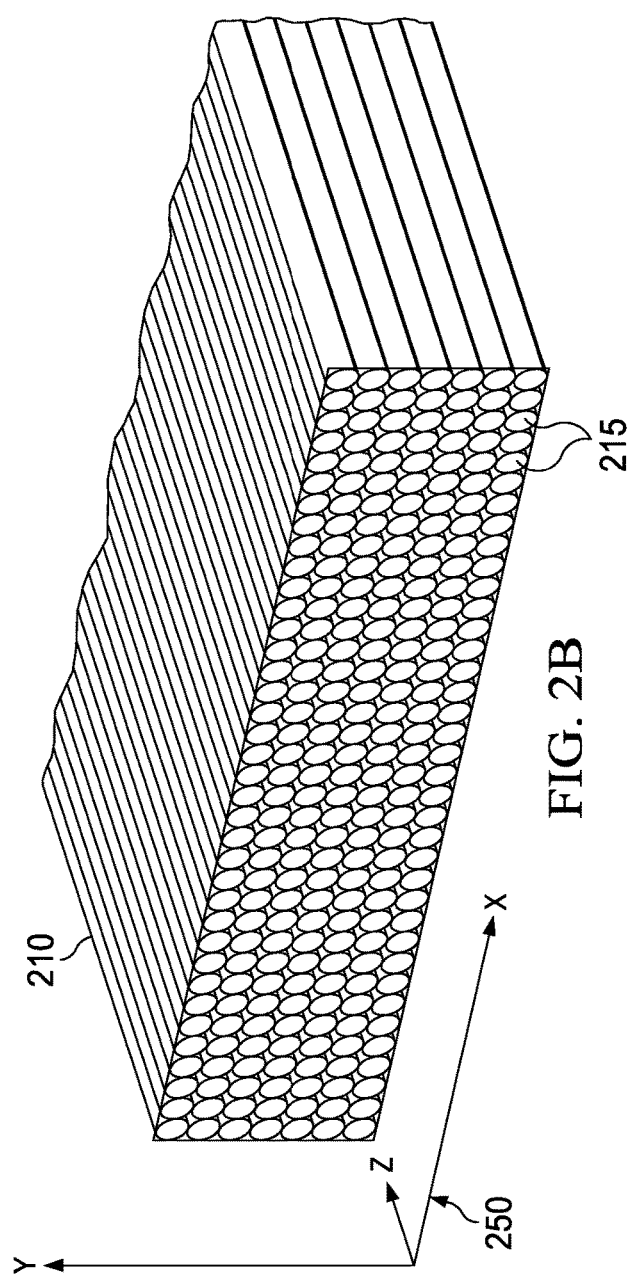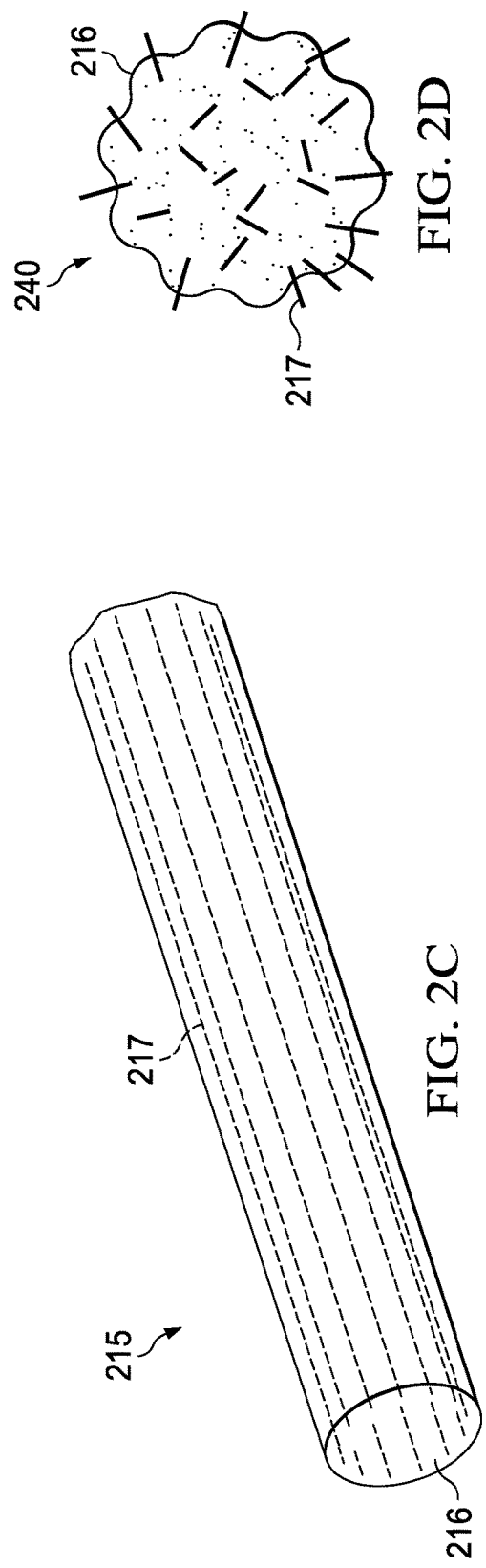

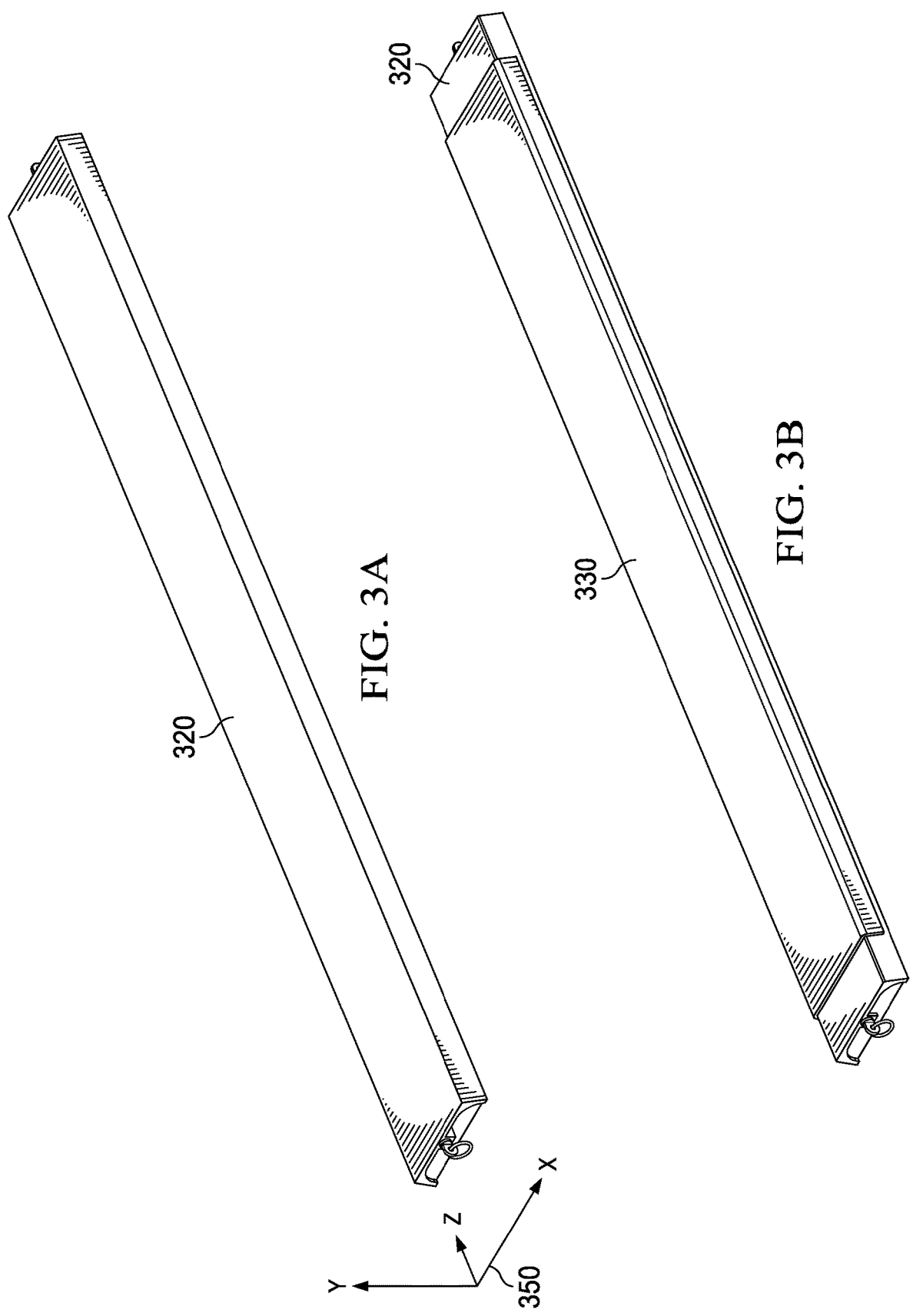

METHOD OF MANUFACTURING AN ASSEMBLY FIXTURE AND A COMPOSITE PRODUCT

CROSS-REFERENCE TO RELATED APPLICATION

This application is a divisional and claims the benefit of priority under 35 U.S.C. § 120 of U.S. application Ser. No. 16/814,622, filed on Mar. 10, 2020, entitled "ASSEMBLY FIXTURE WITH ANISOTROPIC THERMAL PROPERTIES," Inventors David G. Carlson et al., issued as U.S. Pat. No. 11,077,596 on Aug. 3, 2022, which application is a divisional and claims the benefit of priority under 35 U.S.C. § 120 of U.S. application Ser. No. 15/710,797, filed on Sep. 20, 2017, entitled "ASSEMBLY FIXTURE WITH ANISOTROPIC THERMAL PROPERTIES," Inventors David G. Carlson et al., issued as U.S. Pat. No. 10,654,208 B2 on May 19, 2020. The disclosure of the prior applications are considered part of and are incorporated in their entirety by reference in the disclosure of the applications.

TECHNICAL FIELD

This disclosure relates generally to composite structures, and more particularly, though not exclusively, to tooling used for manufacturing composite structures.

BACKGROUND

Aircraft are often designed using composite structures. A composite structure, for example, may include a combination of different materials integrated together to achieve certain structural properties. Manufacturing a composite structure, however, may require specialized manufacturing tooling to be designed and built for the particular composite structure. Moreover, building the tooling used to manufacture a composite structure can be time-consuming and expensive.

SUMMARY

According to one aspect of the present disclosure, a method may comprise fastening a plurality of components of a composite structure in an assembly fixture, wherein the assembly fixture comprises a plurality of strands of a fiber-reinforced thermoplastic material, wherein the fiber-reinforced thermoplastic material comprises a thermoplastic embedded with a plurality of reinforcement fibers, wherein the plurality of reinforcement fibers is aligned within each strand of the plurality of strands, and wherein the assembly fixture further comprises an anisotropic thermal expansion property based on an orientation of the plurality of reinforcement fibers within the assembly fixture; and heating the assembly fixture in an autoclave to bond the plurality of components of the composite structure.

BRIEF DESCRIPTION OF THE DRAWINGS

FIGS. 2A-D illustrate an example embodiment of an anisotropic assembly fixture.

FIGS. 3A-F illustrate an example embodiment of an anisotropic mold.

DETAILED DESCRIPTION

Figure 1:
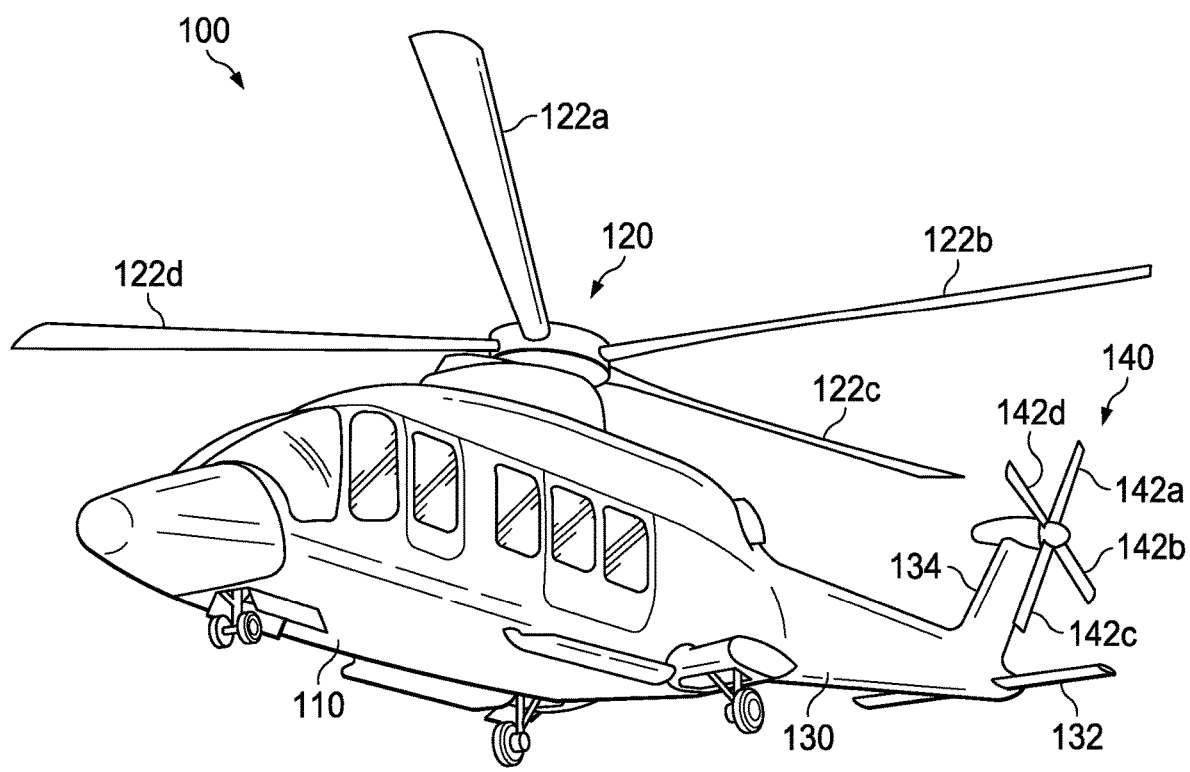
FIG. 1 illustrates an example rotorcraft in accordance with certain embodiments.
Figure 2A:
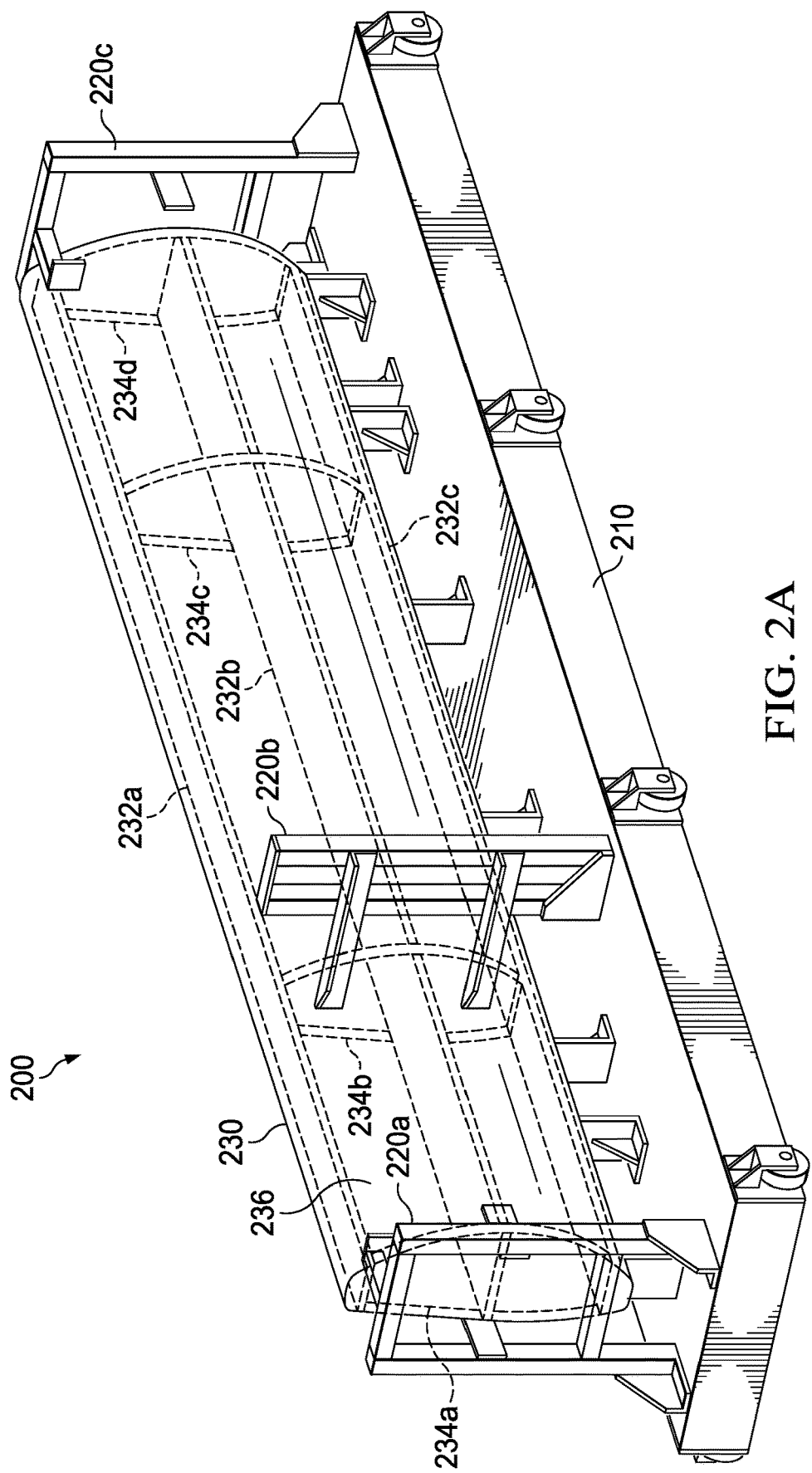

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. Rotorcraft 100 includes a fuselage 110, a main rotor system 120, and an empennage 130. The fuselage 110 is the main body of rotorcraft 100, and may include a cabin (e.g., for crew, passengers, and/or cargo) and/or house certain mechanical and electrical components (e.g., engine(s), transmission, and/or flight controls). The rotor system 120 of rotorcraft 100 is used to generate lift. For example, the rotor system 120 includes a plurality of rotor blades 122a-d that rotate when torque is supplied by the engine(s), which in turn generates lift. Moreover, the pitch of each rotor blade 122 can be adjusted in order to selectively control direction, thrust, and lift for rotorcraft 100. Rotorcraft 100 also includes a tail rotor system 140 to provide anti-torque and/or directional control, which similarly includes a plurality of rotating rotor blades 142a-d, and is positioned on the empennage 130. The empennage 130 further includes a horizontal stabilizer 132 and a vertical stabilizer 134, which respectively provide horizontal and vertical stability for rotorcraft 100.

The components of an aircraft, such as rotorcraft 100, are often designed using composite structures. A composite structure, for example, may include a combination of different materials integrated together to achieve certain structural properties, which are typically superior to the properties of the underlying materials individually. For example, a composite structure may be lightweight yet relatively strong, rendering it particularly suitable for aircraft and/or other applications where weight and/or strength are critical to performance. Accordingly, composite structures are often used in the design of wings, rotor blades, engine blades, propellers, flight control surfaces, fairings, spoilers, stabilizers, airframe structural components, fuselages, various interior components (e.g., floors, walls, fixtures), and so forth. Manufacturing a composite structure, however, may require specialized manufacturing tooling to be designed and built for the particular composite structure. Moreover, building the tooling used to manufacture a composite structure can be time-consuming and expensive.

As an example, a wing or blade for a rotor system often includes a variety of composite components, such as spars, ribs, skin(s), and so forth. These underlying components are often created separately and then subsequently bonded together. For example, the underlying components may be fabricated separately using various molds, and may then be bonded together using an assembly fixture. The fabrication process for a particular component, for example, may involve placing an associated mold in an autoclave to cure the component at an elevated pressure and temperature (e.g., 250+ degrees Fahrenheit). The resulting components may then be bonded together in an assembly fixture, which can be accomplished at either room temperature or an elevated temperature depending on the particular bonding approach used. In some cases, for example, the components may be bonded together in an assembly fixture at room temperature using fasteners and/or paste adhesives. In other cases, however, the components may be bonded together in the assembly fixture at an elevated pressure and temperature (e.g., in an autoclave) using thermoset resins or adhesives. A thermoset resin, for example, is a resin that undergoes an irreversible chemical transformation from a tacky to rigid state when cured at high temperatures, and thus can only be cured once. Compared to room temperature bonding (e.g., using fasteners and/or paste adhesives), high-temperature bonding using thermoset resins may result in a stronger bond and may eliminate and/or reduce the need for mechanical fasteners.

Fabricating and bonding composite components at high temperatures, however, requires the associated molds and assembly fixture(s) to have certain thermal properties, such as suitable thermal expansion properties. For example, when subjected to high temperatures, a material may expand at a particular rate in various directions. The rate at which a material expands in a given direction is represented by its coefficient of thermal expansion (CTE). A material that has the same CTE in all directions may be referred to as isotropic, while a material that does not have the same CTE in all directions may be referred to as anisotropic. Many composite components are designed using isotropic materials with a low CTE in order to minimize expansion when cured at high temperatures. The tooling used to cure the composite components (e.g., assembly fixtures and bond molds) may be similarly designed with appropriate CTE properties to minimize abnormalities and deformation during the curing process. For example, if the CTE properties of the tooling differ meaningfully from those of the composite component being cured, the tooling may stretch and/or compress the composite component during the curing process (e.g., as the temperature rises and falls), which may lead to manufacturing abnormalities and/or tearing or crushing of the composite component. For example, if an assembly fixture has a high CTE, the assembly fixture may expand as its temperature rises during the curing process, causing the resulting component to similarly stretch, grow, and/or tear, and the assembly fixture may subsequently contract after the curing process finishes and its temperature lowers, causing the resulting component to be compressed and/or crushed. Accordingly, in some cases, the tooling used for high-temperature curing of a composite component may be designed using an isotropic material with a low CTE that roughly matches the CTE of the composite component itself. In some cases, for example, the tooling may be designed using Invar, an isotropic nickel-iron alloy with a low CTE. The process of building Invar-based tooling, however, can be very time-consuming and expensive.

Accordingly, this disclosure describes various embodiments of tooling (e.g., assembly fixtures and molds) that can be built efficiently and is suitable for high-temperature curing of composite components. For example, this disclosure describes embodiments of additive-manufactured thermal-anisotropic tooling, which can be built using additive manufacturing and tailored with optimal anisotropic thermal properties. The ability to build the tooling using additive manufacturing significantly reduces the time and expense typically required to build tooling used for high-temperature curing (e.g., Invar-based tooling). Moreover, the ability to tailor anisotropic thermal properties of the tooling allows its thermal expansion properties to be optimized for high-temperature curing. For example, the tooling can be designed with different CTEs in different dimensions to minimize expansion in certain directions, provide compression bonding in certain directions, and/or facilitate extraction of the resulting composite component from the tooling. For example, the tooling can be designed with a low CTE in certain dimension(s) where minimizing thermal expansion is critical to avoiding manufacturing abnormalities. The tooling can also be designed with a CTE in certain dimension(s) that facilitates bonding by exerting compressive forces in certain directions. Finally, the tooling can also be designed with a CTE in certain dimension(s) that facilitates extraction of the composite component from the tooling, for example, by causing the tooling to expand during the curing process so that it subsequently contracts and releases itself from the composite component after the curing process is complete.

In some embodiments, for example, the tooling may be built from a fiber-reinforced thermoplastic resin using additive manufacturing. For example, unlike a thermoset resin that can only be cured once, a thermoplastic resin does not undergo an irreversible chemical transformation when heated at high temperatures, and thus can be cured multiple times. Thus, while a composite component itself may be formed using a thermoset resin that can only be cured once, the associated tooling is formed using a thermoplastic resin that can be cured repeatedly. In this manner, the tooling can be built using additive manufacturing to repeatedly extract and cure layers of the fiber-reinforced thermoplastic resin. Moreover, the additive manufacturing process can be strategically performed in order to align the reinforcement fibers in a manner that achieves desired anisotropic thermal properties. For example, a thermoplastic resin typically has a high CTE, while fiber reinforcements typically have a low CTE. Accordingly, the fiber reinforcements can be aligned in certain direction(s) in the thermoplastic matrix in order to achieve desired CTE properties for certain dimensions of the tooling.

In this manner, the tooling can be built using additive manufacturing, while also allowing its thermal properties to be tailored with optimal CTE values for high-temperature curing. In addition, the flexibility of this additive manufacturing approach enables the resulting tooling to achieve an appropriate stiffness while remaining lightweight, thus improving transportation and handling of the tooling, and facilitating rapid heating and cooling of the tooling due to its lower thermal mass. Moreover, the ability to use additive manufacturing significantly reduces the time and expense required to build tooling with suitable thermal expansion properties for high-temperature curing, thus significantly reducing the cycle time for manufacturing composite components. For example, while Invar-based tooling may take months or years to build, tooling designed using the embodiments of this disclosure may only take day(s) or week(s) to build. Accordingly, the described embodiments can be used to significantly reduce the cycle time for manufacturing composite components. In some embodiments, for example, the described embodiments may be used to efficiently create tooling and reduce the manufacturing cycle time for aircraft components, such as wings, rotor blades, engine blades, propellers, flight control surfaces, fairings, spoilers, stabilizers, airframe structural components, fuselages, various interior components (e.g., floors, walls, fixtures), and so forth. The described embodiments can also be used for other applications, such as the manufacture of land-based vehicles (e.g., cars, buses, trucks), water-based vehicles (e.g., boats, submarines), spacecraft, and/or any other applications involving composite components.

Example embodiments are described below with more particular reference to the remaining FIGURES. It should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples. Moreover, the described embodiments can also be used for other non-aircraft implementations, including land, water, and/or space-based vehicles, among other examples.

FIGS. 2A-D illustrate an example embodiment of an anisotropic assembly fixture 200. Assembly fixture 200 can be used to assemble a composite structure using high-temperature bonding of the underlying components. Moreover, assembly fixture 200 can be built using additive manufacturing and tailored with anisotropic thermal expansion properties that are suitable for high-temperature bonding. The ability to use additive manufacturing to build assembly fixture 200 enables it to be built significantly faster and cheaper than other types of high-temperature bond assembly fixtures (e.g., Invar-based assembly fixtures), thus significantly reducing the manufacturing cycle time for a particular component. Moreover, the ability to tailor the anisotropic thermal expansion properties of assembly fixture 200 allows them to be optimized for high-temperature bonding. Accordingly, unlike other types of assembly fixtures, assembly fixture 200 can be built in a time- and cost-efficient manner, while still achieving appropriate thermal expansion properties for high-temperature bonding. In the illustrated embodiment, assembly fixture 200 is designed for assembling a blade or wing 230 for the tail rotor of a rotorcraft (e.g., tail rotor 140 of rotorcraft 100 from FIG. 1). In other embodiments, however, an assembly fixture for any other type of component can be designed and built using a similar approach.

In the illustrated embodiment, assembly fixture 200 can be used to assemble the underlying components of rotor wing 230 by bonding them together using high-temperature bonding. For example, wing 230 is formed using a variety of components, including spars 232*a-c*, ribs 234*a-d*, and a skin 236, along with various other components omitted from the illustrated example for simplicity. In some cases, these underlying components may be created separately (e.g., using a mold) and then subsequently bonded together using assembly fixture 200. Assembly fixture 200 is used to securely hold the underlying components of wing 230 in the appropriate positions during the bonding process. For example, assembly fixture 200 includes a base structure 210 and a plurality of detail fixtures 220*a-c* extending from the base, which are collectively used to securely position the various components of wing 230, such as spars 232 and ribs 234. In some cases, the various components of wing 230 may then be bonded together using high-temperature bonding. For example, after securing the underlying components of wing 230 in assembly fixture 200, assembly fixture 200 may be placed in an autoclave to bond the components together using bond adhesives (e.g., thermoset resins) that are cured at an elevated pressure and temperature (e.g., 250+ degrees Fahrenheit).

Moreover, assembly fixture 200 can be built using additive manufacturing in a manner that allows its thermal expansion properties to be optimized for high-temperature bonding. For example, growth that results from thermal expansion may vary across different dimensions of a structure depending on the CTE and size of each dimension. In particular, growth in a particular dimension increases with the magnitude of the CTE for that dimension, and also increases with the size of the dimension. Thus, even dimensions with the same CTE will experience varying levels of growth if they differ in size. As an example, wing 230 has a length that is significantly larger than its height and width, and assembly fixture 200 has dimensions with similar proportions in order to accommodate the wing 230. Thus, wing 230 and assembly fixture 200 are much more susceptible to thermal growth across their length than their height and width. The components of wing 230, however, are typically designed using isotropic materials with a low coefficient of thermal expansion (CTE) in order to minimize thermal expansion across all dimensions to avoid manufacturing abnormalities. However, if the CTE properties of assembly fixture 200 differ meaningfully from those of wing 230, thermal expansion may cause assembly tooling 200 to produce manufacturing abnormalities or defects in wing 230 during the bonding process. For example, as assembly fixture 200 thermally expands during the bonding process due to its rising temperature, assembly fixture 200 may stretch and/or tear wing 230 if they expand at meaningfully different rates. Similarly, as assembly fixture 200 subsequently contracts after the bonding process completes and its temperature lowers, assembly fixture 200 may compress and/or crush wing 230. While assembly fixture 200 could be designed using Invar (an isotropic material with a low CTE) so that it roughly matches the CTE of wing 230 in all dimensions in order to minimize manufacturing abnormalities, the process of building Invar-based tooling can be very time-consuming and expensive. Moreover, it may be sufficient for assembly fixture 200 to only match the CTE of wing 230 in the length dimension, as that dimension is significantly larger and thus more susceptible to thermal growth than the other dimensions.

Accordingly, assembly fixture 200 is designed using a material that can be additively manufactured with tailored anisotropic thermal properties, thus allowing assembly fixture 200 to be built in a fast and cost-efficient manner, and also tailored with a low CTE in the length dimension to minimize thermal growth that might otherwise subject wing 230 to manufacturing abnormalities. In some embodiments, for example, assembly tooling 200 may be built using an anisotropic material 240 formed as a fiber-reinforced thermoplastic matrix. For example, as shown in FIG. 2D, anisotropic material 240 may include a thermoplastic resin or matrix 216 impregnated with fibers 217. A thermoplastic matrix 216, for example, is a plastic material or polymer that becomes pliable or moldable at high temperatures and solidifies upon cooling. In some embodiments, for example, thermoplastic matrix 216 may include acrylic (polymethyl methacrylate), acrylonitrile butadiene styrene, nylon, polylactic acid (polylactide), polybenzimidazole, polycarbonate, polyether sulfone, polyoxymethylene, polyetherether ketone, polyetherimide, polyethylene, polyphenylene oxide, polyphenylene sulfide, polypropylene, polystyrene, polyvinyl chloride, and/or teflon, among other examples. Moreover, in some embodiments, fibers 217 may include carbon fibers, graphite fibers, glass fibers, and/or any other suitable type of reinforcement fiber. Prior to the additive manufacturing process, the fibers 217 of anisotropic material 240 are randomly arranged within thermoplastic matrix 216. During the additive manufacturing process, however, the anisotropic material 240 can be extruded in a manner that causes fibers 217 to become aligned in a particular direction within thermoplastic matrix 216. Moreover, because thermoplastic matrix 216 typically has a high CTE while reinforcement fibers 217 typically have a low CTE, the resulting structure created using this approach will have a low CTE in dimension(s) that correspond with the directional alignment of fibers 217, and a high CTE in the remaining dimensions. Accordingly, the additive manufacturing process can be performed strategically in order to align the reinforcement fibers 217 in a manner that achieves desired anisotropic thermal properties in the resulting assembly fixture 200.

For example, as depicted by FIGS. 2B and 2C, assembly fixture 200 can be additively manufactured using fused deposition modeling (FDM) to extrude anisotropic material 240 in layers or strands 215 in the lengthwise direction to form the base 210 of assembly fixture 200. As the layers or strands 215 of anisotropic material 240 are extruded through a nozzle, the fibers 217 become aligned in the direction in which the layers or strands 215 are extruded. In this manner, the resulting base structure 210 for assembly fixture 200 has a low CTE in the lengthwise dimension, but a high CTE in the height and width dimensions (e.g., as shown by graph 250 of the CTE properties of base 210). Moreover, while a low CTE is important for the length of base 210, a high CTE is acceptable for its height and width, as those dimensions are significantly smaller and thus much less susceptible to thermal growth.

The detail fixtures 220a-c of assembly fixture 200 can be additively manufactured in a similar manner, except the anisotropic material 240 may be extruded in a manner that achieves a low CTE in the height dimension of each detail fixture 200, given that the height of a detail fixture 220 is its largest dimension and thus is more susceptible to thermal growth than its width or depth. In some embodiments, for example, each detail fixture 220 may be additively manufactured by extruding anisotropic material 240 in layers or strands 215 that are oriented along its height.

Finally, in some embodiments, the thermal properties of assembly fixture 200 can be further tailored in order to leverage thermal expansion for compression bonding purposes. For example, assembly fixture 200 can be designed so that its CTE in the lengthwise dimension of its base 210 is slightly smaller than the CTE of wing 230. In this manner, assembly fixture 200 will thermally expand at a slightly slower rate than wing 230 in the lengthwise dimension, creating pressure between wing 230 and assembly fixture 200 as they press against each other, and thus producing a compressive force that aids the bonding process. Accordingly, this approach may reduce or eliminate the need to use mechanical pressurizers as aids during the bonding process. In some embodiments, for example, tailoring the lengthwise CTE of assembly fixture 200 for compression bonding purposes can be achieved by forming the anisotropic material 240 using appropriate types and quantities of underlying materials, and/or extruding anisotropic material 240 in an appropriate arrangement during the additive manufacturing process. For example, anisotropic material 240 can be formed by selecting a thermoplastic matrix 216 and fibers 217 with appropriate CTE properties, and/or adjusting the density of fibers 217 within thermoplastic matrix 216 to alter the resulting CTE properties of anisotropic material 240.

In this manner, assembly fixture 200 can be additively manufactured with tailored anisotropic thermal properties, thus allowing assembly fixture 200 to be built in a fast and cost-efficient manner and with suitable thermal expansion properties for high-temperature bonding of the components of wing 230. Accordingly, the manufacturing cycle time for wing 230 can be significantly reduced, as the requisite tooling can be built significantly faster than is possible for existing types of tooling.

FIGS. 3A-F illustrate an example embodiment of an anisotropic mold 300. Mold 300 can be used, for example, to fabricate a composite component using high-temperature curing. Moreover, mold 300 may be created using additive manufacturing and tailored anisotropic thermal properties, thus allowing mold 300 to be built in a fast and cost-efficient manner and with suitable thermal expansion properties for high-temperature curing of a composite component. In the illustrated embodiment, mold 300 is designed to fabricate a spar 332 that can be used in the assembly of a wing or blade for the tail rotor of a rotorcraft. In some embodiments, for example, spar 332 fabricated by mold 300 may be subsequently used by assembly fixture 200 from FIG. 2 for the assembly of a tail rotor wing 230. In other embodiments, however, mold 300 may be designed to fabricate any other type of composite component.

In the illustrated embodiment, spar 332 is fabricated by shaping a thermoset composite spar material 330 in mold 300, and then curing spar material 330 at a high temperature and pressure (e.g., using an autoclave). The spar material 330, for example, may be a fiber-reinforced thermoset matrix, such as a thermoset resin impregnated with reinforcements fibers. A thermoset resin, for example, is a resin that undergoes an irreversible chemical transformation from a tacky to rigid state when cured at high temperatures. Moreover, reinforcement fibers can be impregnated in the thermoset resin using an orientation designed to achieve desired structural properties for spar 332. In some embodiments, for example, spar material 330 may be carbon epoxy, which is an epoxy thermoset resin impregnated with carbon fibers. In other embodiments, however, spar material 330 may include any other type of thermoset resin and/or reinforcement fibers.

Figure 3C:
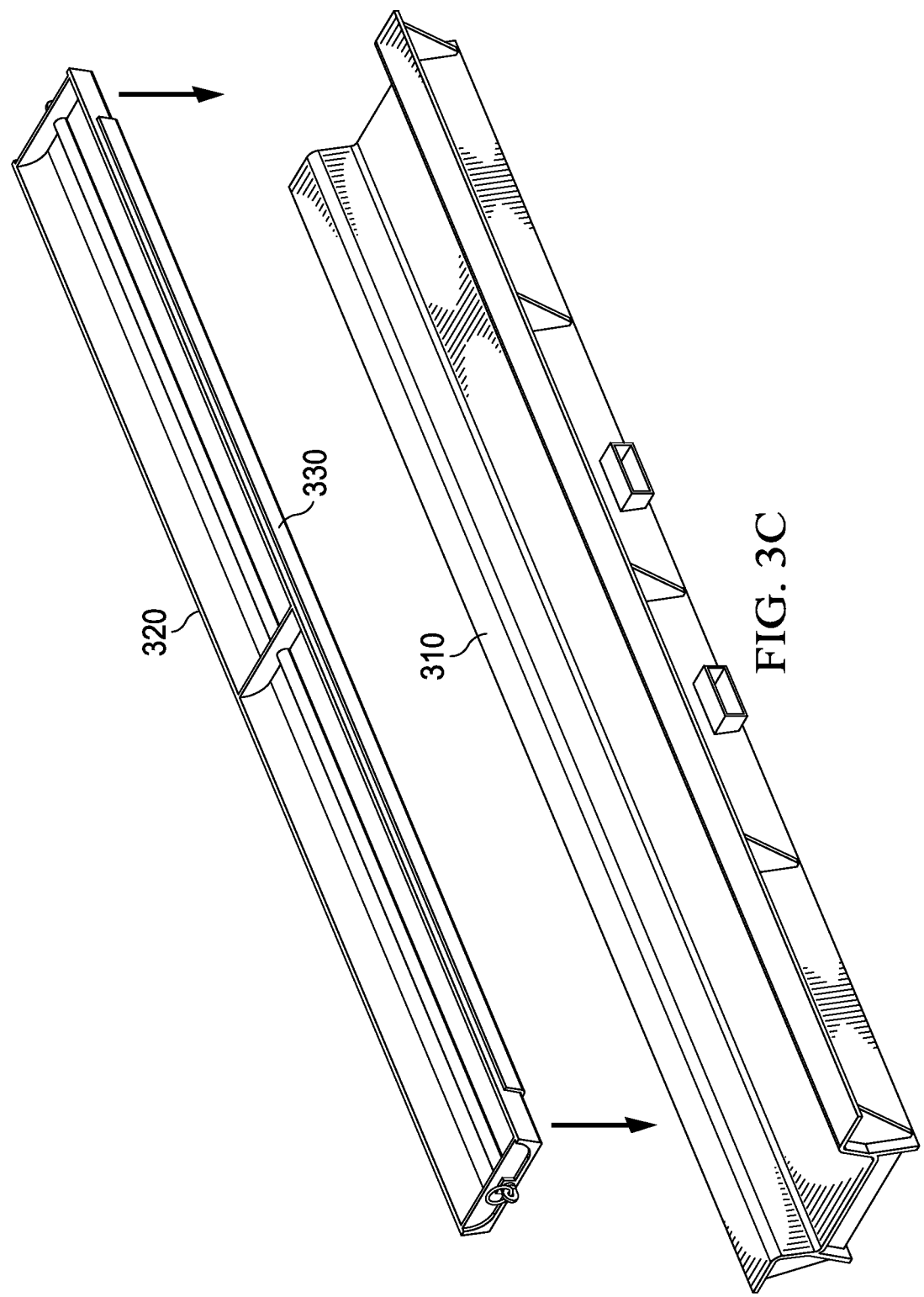
Figure 3D:
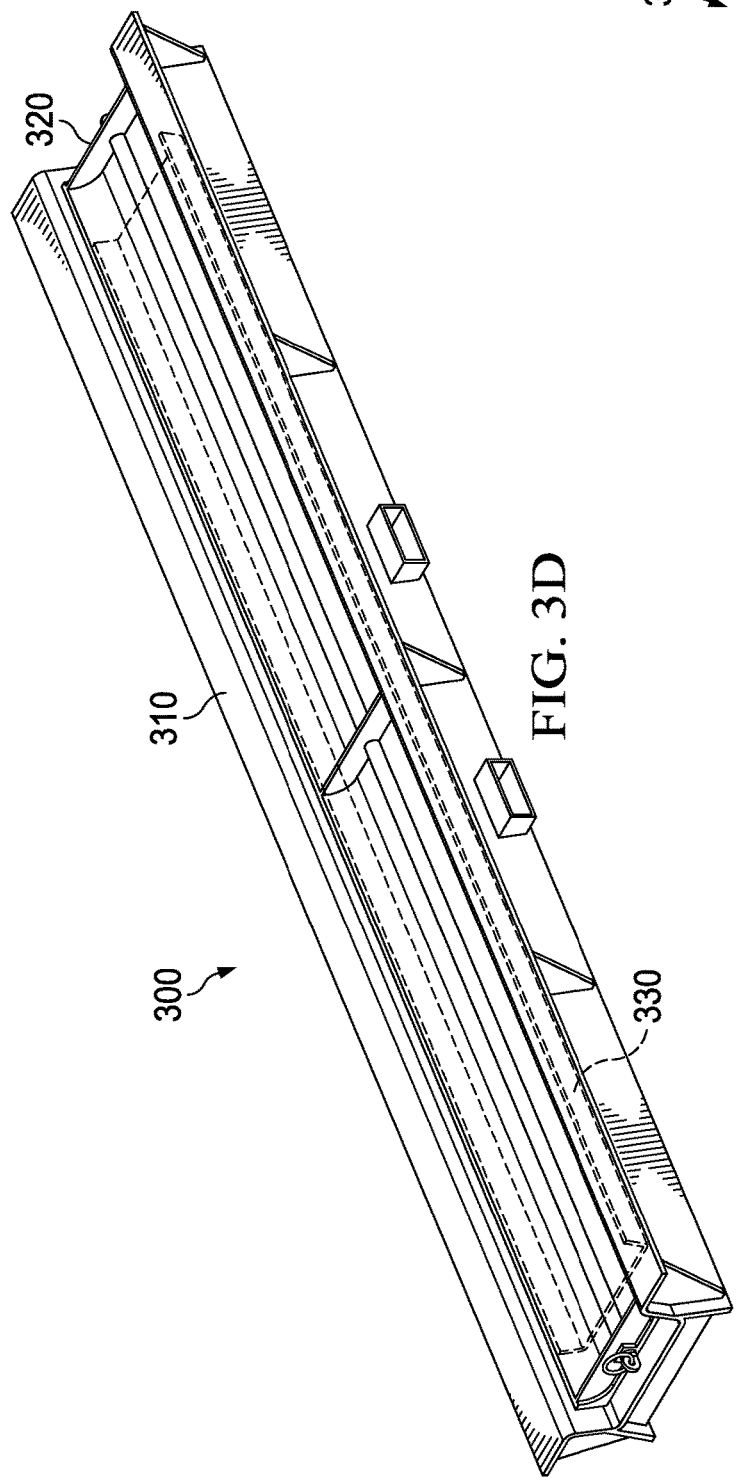
Figure 3E:
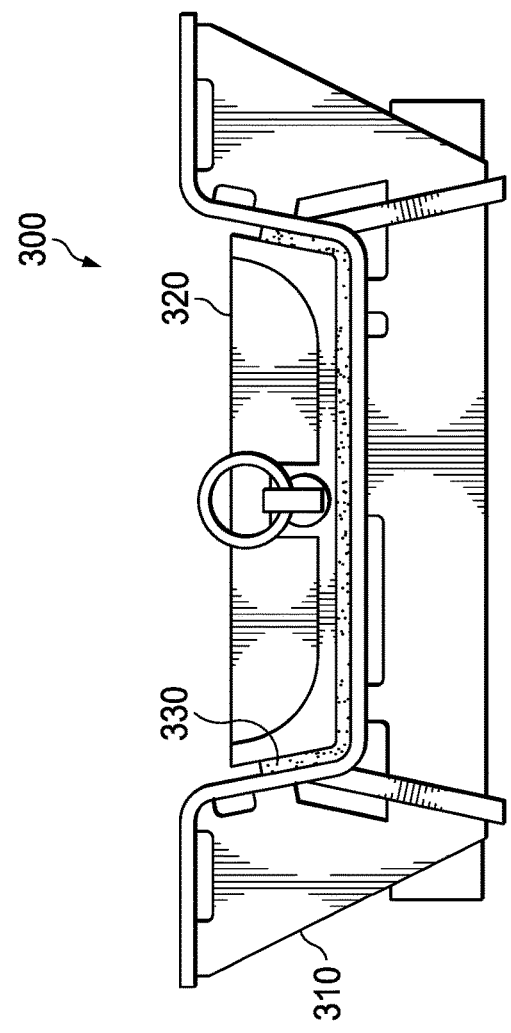
Figure 3F:
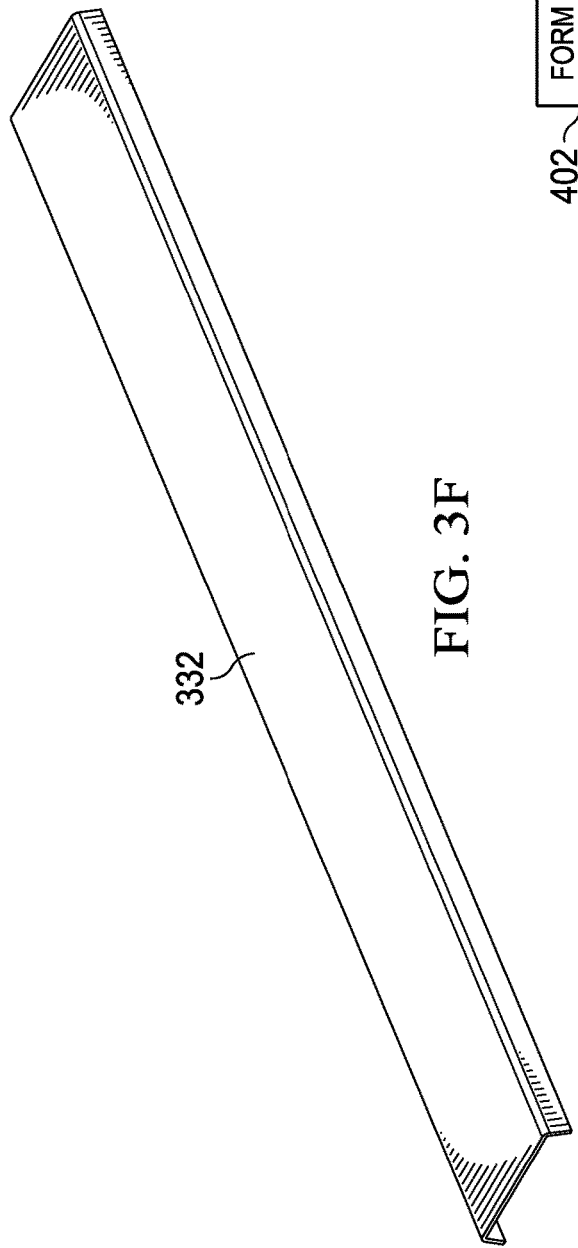

Accordingly, spar material 330 is first molded into to a spar shape using mold 300. For example, mold 300 includes an outer mold line (OML) tool 310 and an inner mold line (IML) tool 320. OML tooling 310 is used to shape the outer surface of the spar, while IML tooling 320 is used to shape the inner surface of the spar. IML tooling 320 is initially separate from OML tooling 310 (as shown by FIG. 3A), allowing spar material 330 to be laid up on IML tooling 320 in numerous layers to form the shape of the spar (as shown by FIG. 3B). IML tooling 320 is then flipped over and inserted into OML tooling 310 (as shown by FIG. 3C). In this manner, after spar material 330 is shaped appropriately on IML tooling 320, it is subsequently compressed between OML tooling 310 and IML tooling 320, as shown by FIGS. 3D and 3E. Spar material 330 can then be cured in mold 300 at a high temperature and pressure (e.g., in an autoclave), causing it to transform from a tacky to rigid state, thus forming the resulting spar 332 (as shown by FIG. 3F).

Moreover, mold 300 can be designed with thermal expansion properties that are optimal for high-temperature curing of a spar. In some embodiments, for example, OML tooling 310 may be designed with a low CTE in its width dimension, while IML tooling 320 may be designed with a high CTE in its width dimension. In this manner, spar material 330 can be initially shaped on IML tooling 320 in a smaller form than the final resulting spar 332, allowing the IML tooling 320 with the shaped spar material 330 to be easily inserted into OML tooling 310. Moreover, during the curing process, the CTE differential for the width dimension of OML tooling 310 and IML tooling 320 causes spar material 330 to stretch to its full size, while also being pressurized or compacted between the respective tooling components. For example, the high CTE for the width of IML tooling 320 causes it to thermally expand, thus stretching spar material 330 to its full width until it reaches the walls of OML tooling 310, and OML tooling 310 then limits any further expansion due to its low CTE. In this manner, spar material 330 is pressurized or compacted between OML tooling 310 and IML tooling 320, which aids in achieving a well-formed spar 332 at the completion of the curing process. Moreover, when the curing process completes, the width dimension of IML tooling 320 subsequently contracts as its temperature returns to normal, thus releasing itself from the resulting spar 332. In this manner, the high CTE for the width of IML tooling 320 also serves to automatically extract the resulting spar 332 from mold 300, thus eliminating the need for a separate extraction step.

Moreover, it may also be desirable to design OML tooling 310 and IML tooling 320 with a low CTE in the length dimension in order to minimize manufacturing abnormalities during fabrication of the spar material 330. For example, because OML tooling 310 and IML tooling 320 are significantly larger in length than in height or width, they are much more susceptible to thermal growth across their length, which can cause them to stretch or tear the resulting spar 332 as they thermally expand during the curing process, and/or crush spar 332 as they subsequently contract when the curing process completes. Accordingly, designing OML tooling 310 and IML tooling 320 with a low CTE in the length dimension minimizes thermal expansion in that dimension, thus reducing the likelihood of manufacturing abnormalities in the resulting spar 332.

While OML tooling 310 and IML tooling 320 could be designed using isotropic thermal materials, exclusively using isotropic materials is an inflexible approach that does not allow the optimal CTE to be achieved for all dimensions of both tooling components. For example, as noted above, it may be desirable for OML tooling 310 and IML tooling 320 to have different CTEs in their width dimensions, but a low CTE in their length dimensions. Accordingly, the desired CTE differential in the width dimension could be achieved by designing OML tooling 310 using an isotropic material with a low CTE (e.g., Invar), while designing IML tooling 320 using an isotropic material with a high CTE (e.g., aluminum). However, while a high isotropic CTE for IML tooling 320 is desirable for its width dimension (e.g. to achieve the appropriate CTE differential between the respective tooling components), it is undesirable for its length dimension, as the high CTE subjects IML tooling 320 to thermal expansion in the length dimension, which can produce manufacturing abnormalities in the fabricated spar 332. On the other hand, if IML tooling 320 is designed using an isotropic material with a low CTE (e.g., Invar) instead of a high CTE, its low isotropic CTE is desirable for its length dimension to minimize thermal expansion, but undesirable for its width dimension given that the respective tooling components would no longer have a CTE differential in the width dimension. Accordingly, if OML tooling 310 and IML tooling 320 are designed exclusively using isotropic materials, they can either both have a low CTE in all directions in order to minimize thermal expansion, or they can have a mismatched CTE in all directions in order to leverage the benefits of the CTE differential in the width dimension, but both advantages cannot be achieved simultaneously.

Accordingly, in some embodiments, IML tooling 320 can be additively manufactured in a manner that allows it to have tailored anisotropic thermal expansion properties, thus allowing it to be built in a fast and cost-efficient manner and with optimal thermal expansion properties in each dimension. In some embodiments, for example, IML tooling 320 may be built using an anisotropic material formed from a fiber-reinforced thermoplastic matrix, using a similar process described in connection with assembly fixture 200 from FIG. 2. For example, the anisotropic material may include a thermoplastic resin or matrix impregnated with reinforcement fibers. Prior to the additive manufacturing process, the fibers of the anisotropic material may be randomly arranged within the thermoplastic matrix. During the additive manufacturing process, however, the anisotropic material may be extruded in a manner that causes the fibers to become aligned in a particular direction within the thermoplastic matrix. Moreover, because a thermoplastic matrix typically has a high CTE while reinforcement fibers typically have a low CTE, the resulting structure created using this approach will have a low CTE in dimension(s) that correspond with the directional alignment of fibers, and a high CTE in the remaining dimension(s). Accordingly, IML tooling 320 can be additively manufactured in a strategic manner that aligns the reinforcement fibers appropriately in order to achieve the desired anisotropic thermal expansion properties.

For example, IML tooling 320 can be additively manufactured using fused deposition modeling (FDM) to extrude strands or layers of the anisotropic material through a nozzle in an arrangement that ultimately forms the IML tooling component 320. Moreover, as strands of the anisotropic material are extruded through the nozzle, the fibers in the anisotropic material become aligned in the direction in which the strands are extruded. Accordingly, when additively manufacturing IML tooling 320, the strands of anisotropic material can be extruded with a lengthwise orientation, thus achieving a low CTE in the length dimension and a high CTE in the other dimensions (e.g., as shown by graph 350 of the CTE properties of IML tooling 320). In this manner, IML tooling 320 achieves the desired low CTE for its length dimension, and the desired high CTE for its width dimension.

Accordingly, in some embodiments, OML tooling 310 can still be designed using a low CTE isotropic material such as Invar, as the appropriate CTE properties for mold 300 can be achieved when isotropic OML tooling 310 is used in conjunction with anisotropic IML tooling 320. In other embodiments, however, OML tooling 310 can be designed using a similar additive manufacturing process as IML tooling 320, except with strands of the fiber-reinforced thermoplastic material extruded in an arrangement that achieves a low CTE in at least the length and width dimensions.

Finally, a mold for any other type of composite component can be created in a similar manner to that described for mold 300, for example, by processing an appropriate a composite material (e.g., fiber-reinforced thermoplastic and/or any other suitable composite material) in a manner that achieves the desired thermal expansion properties. As one example, the described approach could be used to create a mold for an aircraft skin stringer, which is a component used to fasten the skin of an aircraft. The described approach could also be used to create a mold for an I-beam, for example, tailored with a low CTE in the length dimension and a high CTE in the height dimension (e.g., to minimize thermal growth in the length dimension, while leveraging thermal growth in the height dimension to facilitate extraction of the resulting I-beam from the mold).

Figure 4:
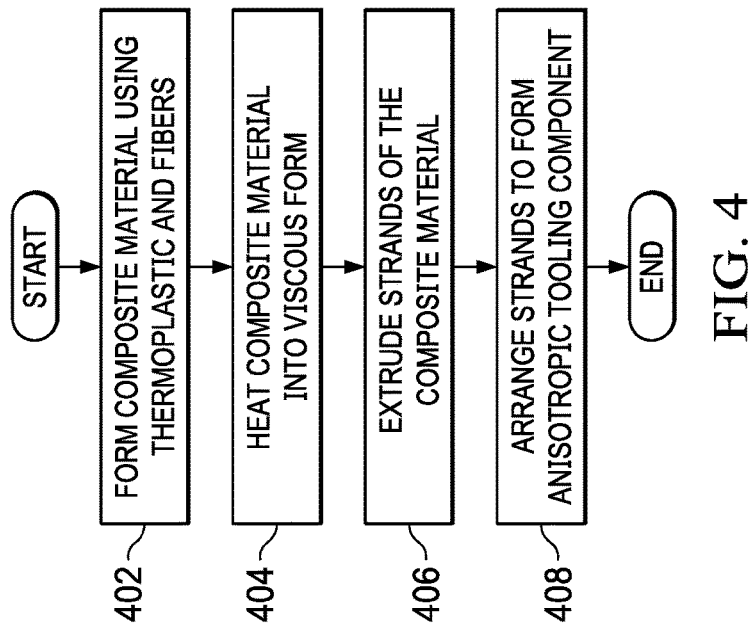
FIG. 4 illustrates a flowchart for additively manufacturing a tooling component.

FIG. 4 illustrates a flowchart 400 for additively manufacturing a tooling component. In some embodiments, for example, flowchart 400 may be used to additively manufacture a tooling component used for the manufacture of a composite structure, such as an assembly fixture or a mold used to manufacture an aircraft component at an elevated temperature (e.g., assembly fixture 200 of FIG. 2 and/or mold 300 of FIG. 3).

The flowchart may begin at block 402 by forming a composite material that comprises a thermoplastic resin and a plurality of reinforcement fibers. The composite material can be formed, for example, by impregnating a thermoplastic resin with a large number of fibers. In some embodiments, the composite material may be formed as small pellets of thermoplastic resin with embedded fibers. Moreover, when the composite material is initially formed, the arrangement of fibers within the thermoplastic resin is random.

In other embodiments, however, the composite material may be formed using any other combination of underlying materials, depending on the desired structural and/or thermal properties. For example, the composite material could be formed using rubber, metal (e.g., aluminum), concrete, plywood, carbon, glass, graphite, and/or ceramic, among other examples.

The flowchart may then proceed to block 404 to heat the composite material to transform it into a viscous form. For example, because the composite material contains a thermoplastic resin, heating the composite material transforms it into a viscous form that can be shaped or molded.

The flowchart may then proceed to block 406 to extrude a plurality of strands of the composite material. For example, after the composite material has been heated into a viscous form, strands of the composite material can be extruded through a nozzle. In some embodiments, for example, a pellet of the composite material can be extruded through the nozzle into a strand. Moreover, in some embodiments, fused deposition modeling can be used to extrude strands of the composite material through the nozzle. In this manner, while the initial arrangement of fibers within the composite material is random, extruding a particular strand of the composite material causes the reinforcement fibers within that strand to align in the direction in which the strand is extruded or oriented.

In other embodiments, however, the composite material may be processed using any other suitable manufacturing techniques, such as melting, pouring, and/or roll forming, among other examples.

The flowchart may then proceed to block 408 to arrange the strands of composite material in a manner that forms a tooling component with anisotropic thermal expansion properties.

When extruding strands of the composite material, for example, the strands can be arranged in a manner that ultimately forms a particular structure or component. For example, a desired structure or component can be additively manufactured (e.g., using fused deposition modeling) by extruding strands of the composite material in an appropriate arrangement.

Moreover, the thermal expansion properties of the resulting structure can be tailored based on the orientation of the strands used to form the structure. For example, a thermoplastic typically has a high CTE, while reinforcement fibers typically have a low CTE. As noted above, however, extruding a strand of the composite material causes the reinforcement fibers to align inside the thermoplastic in the direction that the strand is extruded or oriented. Accordingly, the low CTE of the fibers prevents the thermoplastic from thermally expanding at its normal rate in the direction that the fibers are aligned. In this manner, an extruded strand has a lower CTE in the direction that the fibers are aligned, as the fibers serve to hold the thermoplastic together in that direction.

Accordingly, the thermal expansion properties of the resulting structure can be tailored by arranging the strands in appropriate orientations. In some embodiments, for example, the strands used to form the resulting structure can be oriented in a manner that achieves a low CTE in certain dimension(s) and/or a high CTE in other dimension(s). In some cases, for example, the strands may all be oriented in the same direction to achieve a low CTE for a particular dimension of the structure, and/or a high CTE for the remaining dimensions of the structure. Alternatively, the strands may be oriented in a variety of directions to achieve a low CTE for multiple dimensions of the structure, and/or a high CTE for any remaining dimension of the structure. In some embodiments, for example, the orientation of the strands may alternate within a layer and/or between layers of the resulting structure.

In this manner, any type of tooling component can be additively manufactured with optimal thermal expansion properties. In some embodiments, for example, the described approach can be used to additively manufacture assembly fixtures and molds used for creating composite aircraft components. The ability to additively manufacture a tooling component significantly reduces the time and expense required to build the tooling component, while the ability to tailor the tooling component with anisotropic thermal expansion properties allows it to be optimized for fabricating and/or bonding a composite structure at an elevated temperature. In some embodiments, for example, the tooling can be designed with different CTEs in different dimensions to minimize thermal expansion in certain directions, exert pressure in certain directions (e.g., to facilitate compression bonding), and/or leverage thermal contraction to extract the resulting composite component from the tooling.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A method, comprising:
    fastening a plurality of components of a composite structure in an assembly fixture using at least one fastening structure, wherein the assembly fixture comprises a first plurality of strands of a fiber-reinforced thermoplastic material, wherein the fiber-reinforced thermoplastic material comprises a thermoplastic embedded with a plurality of reinforcement fibers, wherein the plurality of reinforcement fibers is aligned within each strand of the first plurality of strands, and wherein the assembly fixture further comprises first anisotropic thermal expansion property based on an orientation of the plurality of reinforcement fibers within the assembly fixture; and
    heating the assembly fixture in an autoclave to bond the plurality of components of the composite structure;
    wherein the at least one fastening structure comprises:
        a second plurality of strands of the fiber-reinforced thermoplastic material; and
        a second anisotropic thermal expansion property based on an orientation of the plurality of reinforcement fibers within the at least one fastening structure, wherein the second anisotropic thermal expansion property is different than the first anisotropic thermal expansion property.

2. The method of claim 1, further comprising additively manufacturing the assembly fixture.

3. The method of claim 2, wherein the additively manufacturing the assembly fixture comprises arranging the first plurality of strands of the fiber-reinforced thermoplastic material to form the assembly fixture.

4. The method of claim 2, wherein the additively manufacturing the assembly fixture comprises forming the assembly fixture using fused deposition modeling.

5. The method of claim 4, wherein the forming the assembly fixture using fused deposition modeling further comprises extruding the first plurality of strands of the fiber-reinforced thermoplastic material.

6. The method of claim 1, wherein the composite structure comprises an airfoil.

7. The method of claim 6, wherein the airfoil comprises an aircraft wing.

8. The method of claim 1, wherein the composite structure comprises a rotor blade.

9. The method of claim 1, wherein the first anisotropic thermal expansion property of the assembly fixture comprises a coefficient of thermal expansion for a length dimension of the assembly fixture length dimension that is smaller than a coefficient of thermal expansion for a length dimension of the composite structure.

10. The method of claim 9, wherein the assembly fixture comprises a plurality of fastening structures coupled to a base structure, wherein the plurality of fastening structures are configured to secure a plurality of components of the composite structure during the heated bonding process.

11. The method of claim 10, wherein the first anisotropic thermal expansion property of the assembly fixture comprises a low coefficient of thermal expansion for a length dimension of the base structure and a height dimension of the plurality of fastening structures.

12. A method of manufacturing a composite structure using an assembly fixture comprising a first plurality of strands of composite material, the method comprising:
    fastening a plurality of components of a composite structure in the assembly fixture using a fastening structure coupled to the assembly fixture, the assembly fixture having a first anisotropic thermal expansion property based on an orientation of a plurality of reinforcement fibers comprising the composite material; and
    heating the assembly fixture in an autoclave to bond the plurality of components of the composite structure;
    wherein the fastening structure comprises:
        a second plurality of strands of the fiber-reinforced thermoplastic material; and
        a second anisotropic thermal expansion property based on an orientation of the plurality of reinforcement fibers within fastening structure, wherein the second anisotropic thermal expansion property is different than the first anisotropic thermal expansion property.

13. The method of claim 12, wherein the composite material comprises fiber-reinforced thermoplastic material, wherein the fiber-reinforced thermoplastic material comprises a thermoplastic embedded with the plurality of reinforcement fibers.

14. The method of claim 13, wherein the plurality of reinforcement fibers are aligned within the first plurality of strands.

15. The method of claim 12, further comprising additively manufacturing the assembly fixture, the additively manufacturing the assembly fixture comprising at least one of arranging the first plurality of strands of the composite material to form the assembly fixture and using fused deposition modeling by extruding the first plurality of strands of the composite material.

16. The method of claim 12, wherein the composite structure comprises at least one of an airfoil, an aircraft wing, and a rotor blade.

17. The method of claim 12, wherein the first anisotropic thermal expansion property of the assembly fixture comprises a coefficient of thermal expansion for a length dimension of the assembly fixture length dimension that is smaller than a coefficient of thermal expansion for a length dimension of the composite structure.

18. The method of claim 17, wherein the assembly fixture comprises a plurality of fastening structures coupled to a base structure, wherein the plurality of fastening structures are configured to secure a plurality of components of the composite structure during the heated bonding process.

19. The method of claim 18, wherein the first anisotropic thermal expansion property of the assembly fixture comprises a low coefficient of thermal expansion for a length dimension of the base structure and a height dimension of the plurality of fastening structures.

20. A method, comprising:
heating a composite material into a viscous form, wherein the composite material comprises a thermoplastic and a plurality of reinforcement fibers, wherein the plurality of reinforcement fibers is randomly arranged within the thermoplastic;
extruding a first plurality of strands of the composite material, wherein extruding the first plurality of strands causes the plurality of reinforcement fibers within each strand to align; and
arranging the first plurality of strands of the composite material to form an assembly fixture, wherein the assembly fixture comprises a first anisotropic thermal expansion property, and wherein the first anisotropic thermal expansion property is based on an orientation of the plurality of reinforcement fibers within the assembly fixture;
fastening a plurality of components of a composite structure in the assembly fixture with a fastening structure attached to the assembly fixture; and
heating the assembly fixture in an autoclave to bond the plurality of components of the composite structure;
wherein the first anisotropic thermal expansion property of the assembly fixture comprises a coefficient of thermal expansion for a length dimension of the assembly fixture that is smaller than a coefficient of thermal expansion for a length dimension of the composite structure; and
wherein the fastening structure comprises:
a second plurality of strands of the fiber-reinforced thermoplastic material; and
a second anisotropic thermal expansion property based on an orientation of the plurality of reinforcement fibers within the fastening structure, wherein the second anisotropic thermal expansion property is different than the first anisotropic thermal expansion property.

* * * * *